3,719,676
ANTIINFLAMMATORY OXAZOLO TRIAZINE
COMPOUNDS
George Crank, Kensington, New South Wales, Australia, assignor to Lilly Industries Limited, London, England
No Drawing. Filed Oct. 30, 1970, Ser. No. 85,791
Int. Cl. C07d 99/02
U.S. Cl. 260—248 NS    4 Claims

ABSTRACT OF THE DISCLOSURE

Oxazolo triazine compounds of the formula:

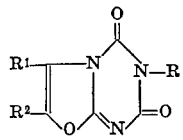

wherein R is aryl or substituted aryl, $R^1$ and $R^2$ independently represent hydrogen, lower alkyl, phenyl or substituted phenyl and additionally, when $R^2$ is hydrogen, $R^1$ represents trifluoromethyl or —COX where X is lower alkoxy or amino, are useful in the treatment of inflammation in warm-blooded mammals when administered in daily doses between 5 and 350 mg./kg. of body weight.

BACKGROUND OF THE INVENTION

Numerous antiinflammatory agents have been developed and used in the treatment of rheumatoid arthritis and various conditions of the skin and other body tissues involving inflammation, swelling, soreness, pain and fever. In the non-steroidal field of antiinflammatory agents, many useful drugs have been developed but for the main part these have been acids and rarely do they provide relief of inflammation without accompanying side-reactions, particularly gastric irritation in the case of acids. The search for effective antiinflammatory agents with fewer side-effects therefore continues.

The present invention provides a useful antiinflammatory agent comprising an oxazolo triazine derivative.

DETAILED DESCRIPTION

The oxazolo triazine derivatives of the present invention have the formula:

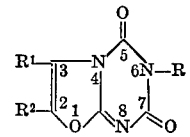

I wherein R is aryl or substituted aryl, $R^1$ and $R^2$ independently represent hydrogen, lower alkyl, phenyl or substituted phenyl and additionally, when $R^2$ is hydrogen, $R^1$ represents trifluoromethyl or —COX where X is lower alkoxy or amino.

By the term "aryl" as used herein is meant cyclic aromatic hydrocarbon groups containing from 6 to 10 carbons, such as phenyl or naphthyl, whilst the term "substituted aryl" or "substituted phenyl" means such aryl or phenyl groups substituted by one or more trifluoromethyl, nitro, halogen or lower alkyl. The term "lower" in qualifying various groups is used herein to mean those groups containing up to 6 carbon atoms, preferably up to 4 carbons. Thus "lower alkyl" includes such groups as methyl, ethyl, isopropyl, n.butyl, t.butyl, n.amyl, s.amyl and n.hexyl and "lower alkoxy" includes such groups as methoxy, ethoxy, n.propoxy, n.butoxy, isobutoxy, isoamyloxy, s.amyloxy, n.hexyloxy and neohexyloxy.

The compounds of Formula I may be prepared by well known synthetic techniques, preferably by reaction of a 2-(amino or substituted amino) oxazole of the formula:

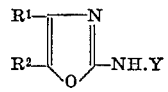

II where $R^1$ and $R^2$ are as defined in Formula I and Y is hydrogen, acetyl or CO.NH.R, with an appropriate proportion of an aryl isocyanate of formula:

<p style="text-align:center">R—N.C.O.</p>

III where R is as defined in Formula I. When Y is hydrogen, the compound of Formula II is reacted with 3 moles of the aryl isocyanate whilst, when Y is acetyl or CO.NH.R, 2 moles of the aryl isocyanate are used. The reactoin sequences described above may be illustrated as follows:

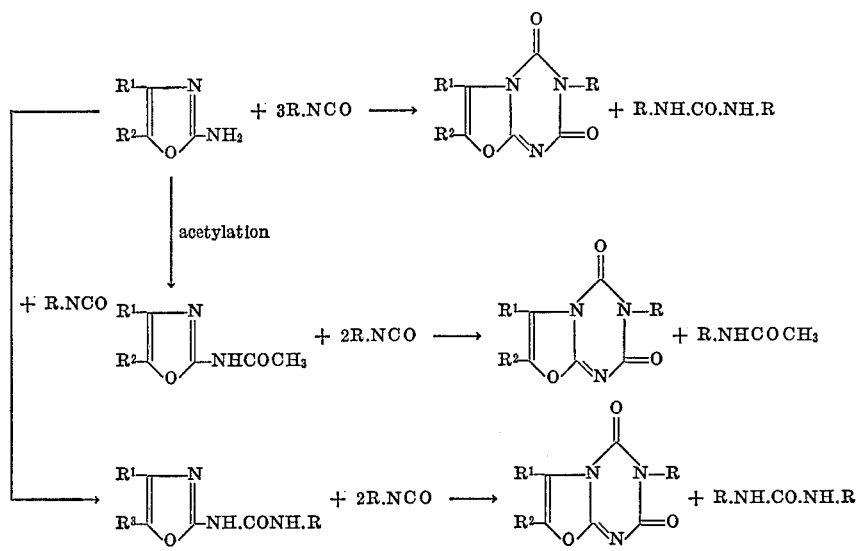

The reaction of the compounds of Formulas II and III is preferably carried out in a basic solvent such as pyridine, the reactants being dissolved in the solvent and heated, preferably at reflux, until the reaction is complete— usually after from about 4 to 48 hours. The solvent is then removed, for example by evaporation, and the resultant solid purified by crystallisation from a suitable solvent such as ethanol, dimethylformamide or chloroform. As can be seen from the above reaction sequence, the reaction involving a 2-aminooxazole or an oxazole urea results in the formation of symmetrical ureas as by-products. Depending on the reactants being used, these ureas may be difficult to separate completely from the desired product and accordingly the reaction with the 2-acetamido oxazole, which results in the formation of an easily separable acetanilide by-product, is preferred. The acetamido oxazole is readily prepared by reacting the corresponding 2-amino oxazole with a suitable acetylating agent such as acetic anhydride or acetyl chloride. If used, the oxazole ureas are also readily prepared from the corresponding 2-amino oxazoles by reaction with an equimolar proportion of the required isocyanate, the reaction preferably being carried out in an anhydrous solvent, for example dry toluene. The 2-amino oxazole starting materials are either known compounds or may be prepared by conventional synthetic procedures for the production of oxazole derivatives.

The following compounds are illustrative of those which can be employed in the present invention:

6-phenyloxazolo-(3,2-a)-s-triazine-5,7-dione
6-(m-chlorophenyl)oxazolo-(3,2-a)-s-triazine-5,7-dione
6-($\beta$-naphthyl)oxazolo-(3,2-a)-s-triazine-5,7-dione
3-methyl-6-(p-trifluoromethylphenyl)oxazolo-(3,2-a)-s-triazine-5,7-dione
3-methyl-6-(o-bromophenyl)oxazolo-(3,2-a)-s-triazine-5,7-dione
3-methyl-6-phenyloxazolo-(3,2-a)-s-triazine-5,7-dione
2,3-dimethyl-6-(m-bromophenyl)oxazolo-(3,2-a)-s-triazine-5,7-dione
3-isopropyl-6-($\alpha$-naphthyl)oxazolo-(3,2-a)-s-triazine-5,7-dione
2,3,6-tri-(p-chlorophenyl)oxazolo-(3,2-a)-s-triazine-5,7-dione
2,3-diphenyl-6-(p-t.butylphenyl)oxazolo-(3,2-a)-s-triazine-5,7-dione
2,3-di-(o-tolyl)-6-phenyloxazolo-(3,2-a)-s-triazine-5,7-dione
3-n.butyl-6-(2-chloro-$\alpha$-naphthyl)-(3,2-a)-s-triazine-5,7-dione
3-trifluoromethyl-6-($\alpha$-naphthyl)oxazolo-(3,2-a)-s-triazine-5,7-dione
3-trifluoromethyl-6-phenyloxazolo-(3,2-a)-s-triazine-5,7-dione
3-trifluoromethyl-6-(m-chlorophenyl)oxazolo-(3,2-a)-s-triazine-5,7-dione
3-trifluoromethyl-6-(p-nitrophenyl)oxazolo-(3,2-a)-s-triazine-5,7-dione
3-trifluoromethyl-6-(2,4-dichlorophenyl)oxazolo-(3,2-a)-s-triazine-5,7-dione
6-(p-chlorophenyl)oxazolo-(3,2-a)-s-triazine-5,7-dione
6-(o-chlorophenyl)oxazolo-(3,2-a)-s-triazine-5,7-dione
6-($\alpha$-naphthyl)oxazolo-(3,2-a)-s-triazine-5,7-dione
2,3-diphenyl-6-(o-chlorophenyl)oxazolo-(3,2-a)-s-triazine-5,7-dione
2,3-diphenyl-6-(p-nitrophenyl)oxazolo-(3,2-a)-s-triazine-5,7-dione
3-ethoxycarbonyl-6-phenyloxazolo-(3,2-a)-s-triazine-5,7-dione
3-t.butoxycarbonyl-6-phenyloxazolo-(3,2-a)-s-triazine-5,7-dione
3-ethoxycarbonyl-6-($\alpha$-naphthyl)oxazolo-(3,2-a)-s-triazine-5,7-dione
3-ethoxycarbonyl-6-(p-nitrophenyl)oxazolo-(3,2-a)-s-triazine-5,7-dione
3-methoxycarbonyl-6-(o-tolyl)oxazolo-(3,2-a)-s-triazine-5,7-dione
6-phenyloxazolo-(3,2-a)-s-triazine-5,7-dione-3-carboxamide
6-(o-tolyl)oxazolo-(3,2-a)-s-triazine-5,7-dione-3-carboxamide
6-(p-t.butylphenyl)oxazolo-(3,2-a)-s-triazine-5,7-dione-3-carboxamide
2,3-dimethyl-6-(2,4-dichlorophenyl)oxazolo-(3,2-a)-s-triazine-5,7-dione
6-(o-tolyl)oxazolo-(3,2-a)-s-triazine-5,7-dione The compounds of Formula I are useful as anti-inflammatory agents in that they alleviate the effects of inflammation in mammals when administered orally, rectally or parenterally at a daily dose of between 5 and 350 mg./kg. of body weight. The precise dose administered and the route of administration will vary depending upon the severity and nature of the inflammation and the general health of the mammal being treated.

It can however be varied quite substantially from the above dosage range since the compounds of this invention are relatively non-toxic to mammals. For example the $LD_{50}$ in mice is generally greater than 800 mg./kg. i.p. and from 1000 to greater than 1600 mg./kg. orally.

The compounds of Formula I will normally be administered in the form of a pharmaceutical composition comprising at least one compound of Formula I in association with a pharmaceutically acceptable diluent or carrier therefor. Such compositions are well known in the pharmaceutical art. For example in parenteral administration the composition may take the form of a sterile aqueous solution, suspension or emulsion or alternatively a non-aqueous solution, suspension or emulsion can be prepared using diluents such as propylene glycol, polyethylene glycol or vegetable oils. For oral administration, the active ingredient may be enclosed in a suitable carrier such as a gelatin capsule or mixed with suitable diluents and compressed into a tablet. Alternatively liquid dosage forms such as aqueous solutions or suspensions may be administered. For rectal administration, the active ingredient may be formulated as a suppository, for example by mixing the compound of Formula I with molten oil of theobroma and allowing the mixture to set in a suitable suppository mould.

Preferably each dosage unit, for example a tablet, capsule, ampoule of injection solution, suppository or teaspoonful of oral suspension, contains from about 50 to 1000 mg. of the compound of Formula I and single or multiple dosage units may be administered daily until the inflammatory condition is alleviated.

The following non-limiting examples will further illustrate the present invention:

EXAMPLE 1

2-amino-oxazole (1.68 g. 0.02 mole) and phenyl isocyanate (8.4 g. 0.07 mole) were dissolved in pyridine (12 ml.) and the mixture was heated under reflux in an oil bath for 6 hours. Pyridine was removed by evaporation in vacuo to leave a brown solid, which was dissolved in ethanol (300 ml.) and charcoaled. Cooling of the ethanolic solution gave a crystalline solid, which was purified by recrystallisation from ethanol.

Product: 4.0 g. (87%) of 6 - phenyl-oxazolo-(3,2-a)-triazine-5,7-dione as a white crystalline solid, M.P. 240–242° C.

Analysis.—$C_{11}H_7N_3O_3$ requires (percent): C=57.7; H=3.1; N=18.3. Found (percent): C=57.4; H=3.4; N=18.5.

EXAMPLE 2

2-acetamido-oxazole (3.78 g. 0.03 mole) and p-chlorophenyl isocyanate (9.21 g. 0.06 mole) were refluxed in pyridine (15 ml.) for 5 hours. The pyridine was removed by evaporation leaving a dark solid which was dissolved in ethanol (300 ml.) The solution was charcoaled and concentrated giving a crystalline precipitate. The material was collected by filtration and was then recrystallised from ethanol.

Product: 3.5 g. (44%) of 6-(p-chlorophenyl)oxazolo-(3,2-a)-s-triazine-5,7-dione as a white crystalline solid, M.P. 235–237° C.

Analysis.—$C_{11}H_6N_3O_3Cl$ requires (percent): C=50.2; H=2.3; N=15.9; Cl=13.5. Found (percent): C=50.1; H=2.3; N=16.0; Cl=13.4.

EXAMPLE 3

2-acetamido-oxazole (3.78 g. 0.03 mole) and m-chlorophenyl isocyanate (9.2 g. 0.06 mole) were refluxed in pyridine (15 ml.) for 5 hours. Pyridine was then removed by evaporation under reduced pressure to leave a dark solid, which was twice recrystallised from ethanol.

Product: 3.6 g. (46%) of 6-(m-chlorophenyl)oxazolo-(3,2-a)-s-triazine-5,7-dione as a white crystalline solid, M.P. 206–208° C.

Anaylsis.—$C_{11}H_6N_3O_3Cl$ requires (percent): C=50.2; H=2.3; N=15.9; Cl=13.5. Found (percent): C=50.0; H=2.5; N=15.7; Cl=13.7.

EXAMPLE 4

2-acetamido-oxazole (5.04 g. 0.04 mole) and o-chlorophenyl isocyanate (12.3 g. 0.08 mole) were refluxed together in pyridine (20 ml.) for 48 hours. The solvent was removed by evaporation in vacuo leaving a dark oil, which was dissolved in ethanol (150 ml.). Cooling of this solution gave 4.4 g. of a crystalline solid which was discarded. The volume of the filtrate was reduced to about 30 ml., and at this point cooling gave another crop of crystals (4.2 g.—M.P. 170° C.). This material was purified by recrystallisation from chloroform.

Product: 3.3 g. (31%) of 6-(o-chlorophenyl)-oxazolo-(3,2-a)-s-triazine-5,7-dione as a white crystalline solid, M.P. 177–178° C.

Analysis.—$C_{11}H_6N_3O_3Cl$ requires (percent): C=50.2; H=2.3; N=15.9; Cl=13.5. Found (percent): C=50.0; H=2.3; N=15.9; Cl=13.8.

EXAMPLE 5

2-acetamido-oxazole (0.04 mole) and o-tolyl isocyanate (0.08 mole) were refluxed together in pyridine (20 ml.) for 8 hours. The reaction mixture was then treated as in Example 2 to yield, after recrystallisation from ethanol, 6 (o-tolyl)oxazolo-(3,2-a)-s-triazine-5,7-dione.

EXAMPLE 6

Cyanamide (0.5 mole) in water (40 ml.) was treated with hydroxyacetone (0.5 mole) in water (40 ml.). On warming the mixture gently to 40° C., a vigorous reaction commenced and the temperature was maintained at 40–50° C. by cooling. After a few minutes, the reaction was complete, the solution cooled to 20° C. and the pH adjusted to 10 with sodium hydroxide solution. The mixture was extracted with ether and the extracts concentrated to give 2-amino-4-methyloxazole as an oil, B.P. 79–81° C./2 mm. Hg. The oil (0.15 mole) was added to acetic anhydride (20 ml.). A solution was formed within 3 minutes during which the temperature rose from 25 to 75° C. After standing for 3 hours at room temperature, the mixture was concentrated to an oil which rapidly crystallised. On recrystallisation from ethyl acetate, 2-acetamido-4-methyloxazole, M.P. 127–8° C., was obtained.

By reaction of the latter (0.04 mole) with 0.08 mole of phenyl isocyanate, p-trifluoromethylphenyl isocyanate and o-bromophenyl isocyanate using the method of Example 2, there are obtained respectively 3-methyl-6-phenyloxazolo - (3,2-a)-s-triazine-5,7-dione, 3-methyl-6-(p-trifluoromethylphenyl)oxazolo - (3,2-a)-s-triazine-5,7-dione and 3 - methyl - 6 - (o - bromophenyl)oxazolo - (3,2-a)-s-triazine-5,7-dione.

EXAMPLE 7

Bromotrifluoroacetone (0.12 mole) and urea (0.48 mole) were dissolved in t.butanol (250 ml.) and the solution refluxed for 8 hours. After cooling, the solvent was evaporated off, the resultant solid extracted with hot petrol and the petrol extracts evaporated to give 2-amino-4-trifluoromethyloxazole, M.P. 100–2° C. The latter (0.164 mole) was dissolved in acetic anhydride (50 ml.). The mixture was heated at 100° C. for 24 hours, followed by refluxing for 4 hours. Acetic anhydride was removed by evaporation in vacuo to leave an oil which crystallised when triturated with light petrol. On recrystallisation from chloroform/petrol, 2-acetamido-4-trifluoromethyloxazole, M.P. 123° C., was obtained.

The latter (0.03 mole) was reacted with 0.06 mole of α-naphthyl isocyanate, m-chlorophenyl isocyanate and 2,4-dichlorophenyl isocyanate using the method of Example 2 to yield respectively 3 - trifluoromethyl - 6 - (α - naphthyl)oxazolo - (3,2-a) - s - triazine-5,7-dione, 3-trifluoromethyl - 6 - (m-chlorophenyl)oxazolo-(3,2-a)-s-triazine - 5,7 - dione and 3 - trifluoromethyl-6-(2,4-dichlorophenyl)oxazolo-(3,2-a)-s-triazine-5,7-dione.

EXAMPLE 8

Ethyl bromopyruvate (0.306 mole) and urea (0.46 mole) in ethanol (220 ml.) were heated under reflux for 24 hours. The mixture was then concentrated under reduced pressure to give an oil. Water (20 ml.) was added and the pH of the mixture adjusted to 10 by addition of sodium hydroxide solution. The mixture was extracted with ether and the ether extract treated with ethereal hydrogen chloride to yield 2-amino-4-ethoxycarbonyloxazole hydrochloride, M.P. 133–5° C. The latter (0.061 mole) was dissolved in pyridine (50 ml.) and acetic anhydride (30 ml.) was added. The mixture was left at 20° C. for 3 days after which volatile materials were removed by evaporation in vacuo. The solid remaining was recrystallised from ethyl acetate to give 2-acetamido-4-ethoxycarbonyl oxazole, M.P. 150–152° C. Treatment of the latter (0.03 mole) with 0.06 mole of phenyl isocyanate, p-nitrophenyl isocyanate and α-naphthyl isocyanate using the method of Example 2 yielded respectively 3-ethoxycarbonyl - 6 - phenyloxazolo - (3,2-a)-s-triazine-5,7-dione, 3 - ethoxycarbonyl - 6 - (p-nitrophenyl)oxazolo-(3,2-a)-s-triazine-5,7-dione and 3-ethoxy-carbonyl-6-(α-naphthyl) oxazolo-(3,2-a)-s-triazine-5,7-dione.

EXAMPLE 9

2 - acetamido - 4-ethoxycarbonyloxazole (0.015 mole) was dissolved in aqueous ammonia (20 ml., S.G. 0.88). After about 15 minutes, a white crystalline precipitate formed and this was collected, after cooling the mixture to 0° C. for a few minutes, to give a white solid. On recrystallisation from toluene, 2-acetamido oxazole-4-carboxamide, M.P. 212–222° C. (dec.) was obtained. Treatment of the latter (0.03 mole) with 0.06 mole of phenyl isocyanate, o-tolyl isocyanate, p-t.butylphenyl isocyanate and o-chlorophenyl isocyanate using the method of Example 2 yielded respectively 6-phenyloxazolo-(3,2-a)-s-triazine - 5,7 - dione-3-carboxamide, 6-(o-tolyl)oxazolo-(3,2-a) - s-triazine-5,7-dione-3-carboxamide, 6-(p-t.butylphenyl)oxazolo - (3,2-a) - s - triazine-5,7-dione-3-carboxamide and 6 - (o - chlorophenyl)oxazolo-(3,2-a)-s-triazine-5,7-dione-3-carboxamide. Alternatively the same carboxamides may be obtained by reaction of the 2-acetamido-4-ethoxycarbonyloxazole with the isocyanate followed by treatment with an aqueous ammonia.

EXAMPLE 10

2-acetamido-oxazole (3.78 g. 0.03 mole) and p-nitrophenylisocyanate (11 g. 0.067 mole) in pyridine (40 ml.) were refluxed for 6 hours. The pyridine was removed by evaporation and the remaining dark solid was dissolved in ethanol (50 ml.), D.M.F. (50 ml.). Cooling this solution gave a precipitate (5.4 g.) which was recrystallised from ethanol/D.M.F.

Product: 4.0 g. (49%) of 6-(p-nitrophenyl)-oxazolo-(3,2-a)-s-triazine-5,7-dione as yellow needles, M.P. 238–242° C.

*Analysis.*—C₁₁H₆N₄O₅ requires (percent): C=48.2; H=2.2; N=20.4. Found (percent): C=48.0; H=2.4; N=20.3.

EXAMPLE 11

2-acetamido-oxazole (3.78 g. 0.03 mole) and α-naphthyl isocyanate (10.14 g. 0.06 mole), in pyridine (15 ml.) were refluxed for 5 hours. Pyridine was removed by evaporation leaving a dark solid residue, which was purified by two crystallisations from ethanol.

Yield: 3.7 g. (42%) of 6 - (α - naphthyl) - oxazolo-(3,2-a)-s-triazine-5,7-dione as a white crystalline solid, M.P. 252–253° C.

*Analysis.*—C₁₅H₉N₃O₃ requires (percent): C=64.6; H=3.4; N=14.8. Found (percent): C=64.4; H=3.3; N=15.0.

EXAMPLE 12

2-acetamido-4,5-diphenyloxazole (6.12 g. 0.022 mole) and m-chlorophenyl isocyanate (6.6 g. 0.044 mole) in pyridine (35 ml.) were refluxed for 5 hours. Solvent was removed by evaporation leaving a yellow solid, which was recrystallised from ethanol/D.M.F.

Yield: 2.71 g. (30%) of 2,3-diphenyl-6-(m-chlorophenyl)-oxazolo-(3,2-a)-s-triazine-5,7-dione as a white crystalline solid, M.P. 225° C.

*Analysis.*—C₂₃H₁₄ClN₃O₃ requires (percent): C=66.5; H=3.4; N=10.1; Cl=8.5. Found (percent): C=66.4; H=3.7; N=10.3; Cl=8.5.

EXAMPLE 13

2-acetamido-4,5-diphenyl oxazole (5.0 g. 0.018 mole) and p-chlorophenyl isocyanate (5.51 g. 0.036 mole) in pyridine (30 ml.) were refluxed for 5 hours. Concentration of the reaction mixture in vacuo left a yellow solid which was recrystallised from ethanol/D.M.F.

Product: 3.26 g. (43%) of 2,3-diphenyl-6-(p-chlorophenyl)-oxazolo-(3,2-a))-s-triazine-5,7-dione as a white crystalline solid, M.P. 224–225 C.

*Analysis.*—C₂₃H₁₄ClN₃O₃ requires (percent): C=66.5; H=3.4; N=10.01. Found (percent): C=66.7; H=3.5; N=10.1.

EXAMPLE 14

2-acetamido-4,5-diphenyl oxazole (5.0 g. 0.018 mole) and o-chlorophenyl isocyanate (5.51 g. 0.036 mole) were refluxed in pyridine (30 ml.) for 5 hours. The product was obtained by evaporation of the solvent and crystallisation of the residue from ethanol/D.M.F.

Yield: 2.84 g. (38%) of 2,3-diphenyl-6-(o-chlorophenyl)-oxazolo-(3,2-a)-s-triazine-5,7-dione as a white crystalline solid, M.P. 245–246° C.

*Analysis.*—C₂₃H₁₄ClN₃O₃ requires (percent): C=66.5; H=3.4; N=10.1. Found (percent): C=66.5; H=3.8; N=10.2.

EXAMPLE 15

2-acetamido-4,5--diphenyloxazole (9.18 g. 0.033 mole) and p-nitrophenyl isocyanate (10.83 g. 0.066 mole) were refluxed in pyridine (100 ml.) for 5 hours. Removal of the solvent by evaporation left a yellow solid which was recrystallised from ethanol/D.M.F.

Yield: 10.46 g. (75%) of 2,3-diphenyl-6-(p-nitrophenyl)-oxazolo-(3,2-a)-s-triazine-5,7-dione as a yellow crystalline solid, M.P. 243–245° C.

*Analysis.*—C₂₃H₁₄N₄O₅ requires (percent): C=64.8; H=3.3; N=13.1. Found (percent): C=65.1; H=3.2; N=13.1.

I claim:

1. A compound of the formula:

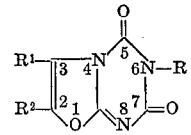

wherein R is phenyl or naphthyl optionally substituted by trifluoromethyl, nitro, halogen or lower alkyl, $R^1$ and $R^2$ independently represent hydrogen, lower alkyl, phenyl optionally substituteed by trifluoromethyl, nitro, halogen or lower alkyl and additionally, when $R^2$ is hydrogen, $R^1$ represents trifluoromethyl or —COX where X is lower alkoxy or amino.

2. Compound according to claim 1, wherein $R^1$ and $R^2$ are both hydrogen, methyl or phenyl, and R is phenyl, α-naphthyl, trifluoromethylphenyl, chlorophenyl, bromophenyl, nitrophenyl or tolyl.

3. Compound according to claim 1, wherein $R^2$ is hydrogen, $R^1$ is methyl, trifluoromethyl, ethoxycarbonyl or —CONH₂, and R is phenyl, α-naphthyl, trifluoromethylphenyl, chlorophenyl, bromophenyl, nitrophenyl or tolyl.

4. Compound according to claim 1, wherein $R^1$ and $R^2$ are both hydrogen and R is phenyl, m-chlorophenyl or p-chlorophenyl.

References Cited

UNITED STATES PATENTS 2,444,609   7/1948   Heimbach et al. ____ 260—248

JOHN M. FORD, Primary Examiner

U.S. Cl. X.R.

260—307 R; 424—249